US009094546B2

(12) United States Patent
Nakajima et al.

(10) Patent No.: US 9,094,546 B2
(45) Date of Patent: Jul. 28, 2015

(54) IMAGE READING SYSTEM, IMAGE READING DEVICE, AND JOB MANAGEMENT PROGRAM

(71) Applicant: SEIKO EPSON CORPORATION, Tokyo (JP)

(72) Inventors: Yuji Nakajima, Nagano (JP); Toshiya Kondo, Nagano (JP); Toshiharu Katada, Nagano (JP); Tomohiro Kuroda, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/068,249

(22) Filed: Oct. 31, 2013

(65) Prior Publication Data

US 2014/0126019 A1    May 8, 2014

(30) Foreign Application Priority Data

Nov. 2, 2012  (JP) ................................ 2012-242451

(51) Int. Cl.
*G06F 3/12*       (2006.01)
*H04N 1/00*      (2006.01)
*G06K 15/00*    (2006.01)

(52) U.S. Cl.
CPC ....... *H04N 1/00225* (2013.01); *H04N 1/00413* (2013.01); *H04N 2201/0081* (2013.01)

(58) Field of Classification Search
CPC .......... H04N 1/00225; H04N 1/00413; H04N 2201/0081; H04N 1/32122; G06F 3/1212; G06F 3/122; G06F 3/1288; G06F 3/126
USPC ............ 358/1.1, 1.4, 1.5, 1.6, 1.9, 1.11, 1.12, 358/1.13, 1.14, 1.15, 1.16, 1.17, 1.18
See application file for complete search history.

(56) References Cited

U.S. PATENT DOCUMENTS

| 8,305,614 | B2 * | 11/2012 | Mori ............................ 358/1.15 |
| 2004/0125414 | A1 | 7/2004 | Ohishi et al. | |
| 2010/0290071 | A1 * | 11/2010 | Okada et al. ................. 358/1.13 |
| 2011/0222090 | A1 * | 9/2011 | Kadowaki .................... 358/1.12 |
| 2012/0133974 | A1 * | 5/2012 | Nakamura ................... 358/1.15 |

FOREIGN PATENT DOCUMENTS

JP       2004-129248 A       4/2004

* cited by examiner

*Primary Examiner* — Thierry L Pham
(74) *Attorney, Agent, or Firm* — Global IP Counselors, LLP (57) ABSTRACT

To make it easy to set a desired job and execute a series of tasks on an image reading device, an image reading system is equipped with an image reading device and a plurality of information terminals connected to the image reading device by a communication network, wherein the information terminals are equipped with setting means (unit) for setting a job to be executed on the image reading device, and response means (unit) for responding to a job inquiry and sending the job to the image reading device. The image reading device is equipped with inquiry means (unit) for sending the job inquiries to the plurality of information terminals, display means (unit) for displaying the jobs received from the plurality of information terminals so as to be selectable, selection means (unit) for selecting the displayed jobs, and execution means (unit) for executing the selected job.

8 Claims, 10 Drawing Sheets

SCAN JOB SETTING

JOB NAME: Job1
COLOR: FULL COLOR
RESOLUTION: 200dpi
FILE FORMAT: PDF
FILE NAME: Img20120515_0001
TRANSFER DESTINATION: DISK
- DISK
- E-MAIL
- PRINTER

[OK] [CANCEL]

Fig. 2B

NETWORK SCAN SETTING

☑ ENABLE NETWORK SCAN

COMPUTER NAME
PC1

☑ USE SCANNER OF THE FOLLOWING GROUP
1

☑ PROTECT WITH PASSWORD
*******

[OK] [CANCEL]

IMAGE READING SYSTEM, IMAGE READING DEVICE, AND JOB MANAGEMENT PROGRAM

CROSS-REFERENCE TO RELATED APPLICATIONS

This application claims priority to Japanese Patent Application No. 2012-242451 filed on Nov. 2, 2012. The entire disclosure of Japanese Patent Application No. 2012-242451 is hereby incorporated herein by reference.

BACKGROUND

1. Technical Field

The present invention relates to an image reading system, an image reading device, and a job management program.

2. Background Technology

From the past, scanners are known that can set in the scanner in advance as a job the series of processes including reading image data from an original copy, transferring the read image data to a PC (personal computer), and attaching that to an e-mail and sending it, and that can select the desired job and execute it. With the scanner noted in Patent Document 1, this kind of job is set using the scanner operating panel.

Japanese Laid-open Patent Publication No. 2004-129248 (Patent Document 1) is an example of the related art.

SUMMARY

Problems to be Solved by the Invention

However, when comparing the work of setting a job using the scanner operating panel and the work of setting it using a PC, it is easier to do the setting work by operating a PC which has a bigger screen size and is equipped with a keyboard and mouse.

However, when assuming an office environment for which the scanner is connected to a plurality of PCs, it is possible for each person to set a job with his own PC so as to be able to transfer image data read by the scanner to his own PC. However, when there is a large number of PCs connected to the scanner, and it is possible to set jobs on each PC, since there is a large number of selectable jobs on the scanner operating panel, there is the problem that it is difficult to quickly select the desired job. In particular, with large scale offices, there are cases when there are several hundred PCs connected to the scanner via a LAN (Local Area Network), and it is possible to set a plurality of jobs with each PC, so the number of selectable jobs with the scanner operating panel becomes huge.

The invention was created to address this kind of problem, and an advantage of the invention is to make it easy to do the series of tasks of setting the desired job and executing it on the image reading device.

Means Used to Solve the Above-Mentioned Problems (1) The image reading system for achieving the advantage noted above is an image reading system equipped with an image reading device, and a plurality of information terminals connected to the image reading device by a communication network, wherein the information terminals are equipped with setting means (unit) for setting a job to be executed by the image reading device, and response means (unit) for responding to a job inquiry and sending the job to the image reading device. Also, the image reading device is equipped with inquiry means (unit) for sending the job inquiry to the plurality of information terminals, display means (unit) for displaying the jobs received from the plurality of information terminals so as to be selectable, selection means (unit) for selecting the displayed jobs, and execution means (unit) for executing the selected jobs.

With the invention, when the desired job to be executed on the image reading device is set in the information terminal, the image reading device fetches that job and displays it so as to be selectable, so the user can select that job with the image reading device and execute it. Therefore, with the invention, it is easy to do the series of tasks of setting the desired job and executing it on the reading device.

(2) The image reading system for achieving the advantage noted above, wherein the setting means (unit) correlates the job to a group ID and sets it, and the display means (unit) receives any group ID selection, and displays the job correlated to the selected group ID so as to be selectable. When using this constitution, even when a large number of information terminals are connected to the image reading device, it is possible to narrow down the jobs displayed so as to be selectable with the image reading device by matching the group ID. Therefore, selecting the job is even easier.

(3) The image reading system for achieving the advantage noted above, wherein the setting means (unit) attaches display priority information and sets the job, and the display means (unit) displays the job extracted based on the display priority information so as to be selectable. When using this constitution, even when a large number of information terminals are connected to the image reading device, it is possible to narrow down the jobs displayed to be selectable on the image reading device based on the display priority information. Therefore, selecting the job is even easier.

(4) Furthermore, when using the constitution of (3) noted above, the setting means (unit) receives the setting of two stages or more of display priority levels, attaches the display priority information indicating the set display priority level, and sets the job, and the display means (unit) displays the jobs with the relatively high display priority level at a relatively high position. When using this constitution, it is possible to narrow down the jobs displayed to be selectable based on two stages or more of display priority level. Therefore, selecting the job is even easier.

(5) Furthermore, when using the constitution of (4) noted above, the setting means (unit) lowers the display priority level after a designated time has elapsed after the display priority level has been raised. When it is possible to set the display priority level for each information terminal, we assume that the user always sets the display priority level to always be high regardless of whether or not he intends to execute the job right away, so that the job a person sets himself is always displayed with priority on the image reading device. When it is possible to do that kind of setting, doing priority display of jobs according to the display priority level no longer has meaning. In light of that, by lowering the display priority level after a designated time has elapsed after the display priority level has been raised, it is possible to easily select a job for which the user has the intention of executing the job right away.

(6) Furthermore, when using the constitution of (5) noted above, the setting means (unit) lowers the display priority level after a period of time has elapsed according to the display priority level after the display priority level has been raised, and the period according to the display priority level is shorter the higher the display priority level is, and is longer the lower the display priority level is.

By doing this, the job is extracted as a selectable display subject on the image reading device according to the urgency by which the user wants to execute a job. In specific terms, when three stages or more can be set for the display priority level, each user must set a suitable display priority level according to the urgency, so it is possible to prevent setting unnecessarily high display priority levels for a job.

Also, the function of each means (unit) noted in the claims can be realized by hardware resources for which the function is specified by the constitution itself, hardware resources for which the functions are specified by the program, or a combination of those. Also, the functions of each of these means (unit) are not limited to being realized by hardware resources that are physically mutually independent. Furthermore, the invention can be established as an image reading device or information terminal invention constituting an image reading device, as a method invention, as a program invention, or as a program recording medium. Of course, this computer program recording medium can be a magnetic recording medium or a magnetic optical recording medium, and can be any kind of recording medium developed in the future.

BRIEF DESCRIPTION OF THE DRAWINGS

Referring now to the attached drawings which form a part of this original disclosure.

DETAILED DESCRIPTION OF EXEMPLARY EMBODIMENTS

Following, we will describe modes for carrying out the invention while referring to the attached drawings. The same code number is given to corresponding structural elements in each drawing, and redundant descriptions will be omitted.

1. First Embodiment

Figure 1:
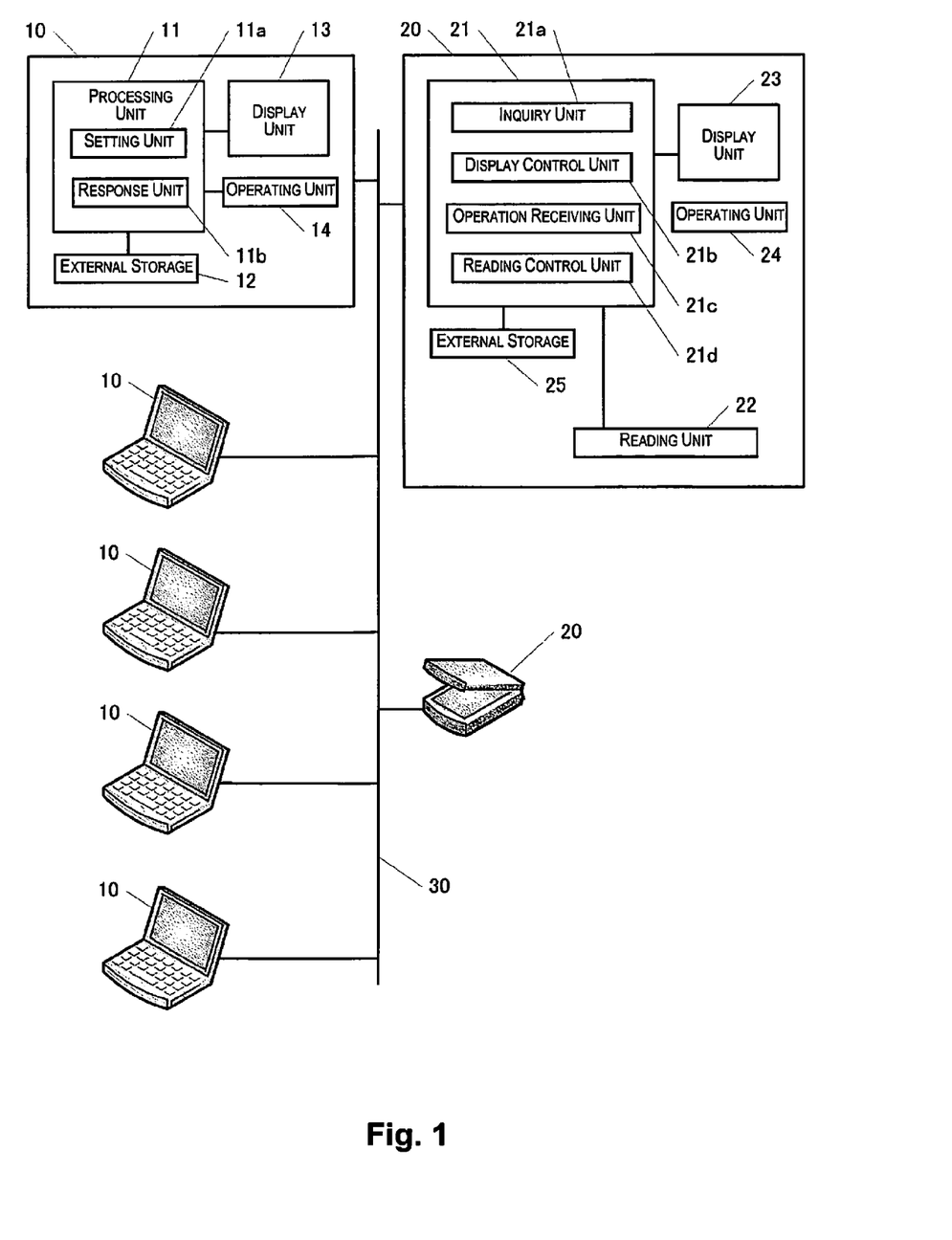
FIG. 1 is a block diagram of an embodiment of the invention.

FIG. 1 shows the image reading system of a first embodiment of the invention. This image reading system is constituted by any number of PCs (Personal Computer) 10 and any number of scanners 20 connected by a LAN (Local Area Network) 30.

The PC 10 as the information terminal is equipped with a processing unit 11 constituted by a CPU, a RAM, an input/output mechanism and the like, a display unit 13 constituted by an LCD (Liquid Crystal Display) and its control circuit, an operating unit 14 constituted by a mouse, monitor and the like, and external storage 12 constituted by a non-volatile storage medium such as flash memory, a hard disk or the like. A job management program for managing jobs executed by the scanner 20 is stored in the external storage 12. By executing the job management program on the processing unit 11, the processing unit 11 functions as a setting unit 11a and a response unit 11b.

The scanner 20 as the image reading device is equipped with a processing unit 21 constituted by a CPU, a RAM, and an input/output mechanism or the like, a display unit 23 constituted by an LCD and its control circuit, an operating unit 24 equipped with various types of switches described later, an external storage 25 constituted by flash memory or the like, and a reading unit 22 constituted by a lens, a linear image sensor, an ADC (Analog Digital Converter), a sub-scan mechanism or the like. Firmware for controlling each part of the scanner 20 is stored in the external storage 25. By executing the firmware on the processing unit 21, the processing unit 21 functions as an inquiry unit 21a, a display control unit 21b, an operation receiving unit 21c, and a reading control unit 21d.

The scanner 20 processes original copy reading and scan data transferring by executing a job. The job can be set by the scanner 20 itself, and can also be set with each PC 10 in the same segment on a communication network. The job is information that defines the reading resolution, the reading method (full color/black and white), the scan data file format, the scan data transfer destination and the like. As the scan data transfer destination, it is possible to specify the external storage 12 of the PC 10 connected to the scanner 20, and also to any information terminal or printer that can receive scan data via e-mail.

Figure 2A:
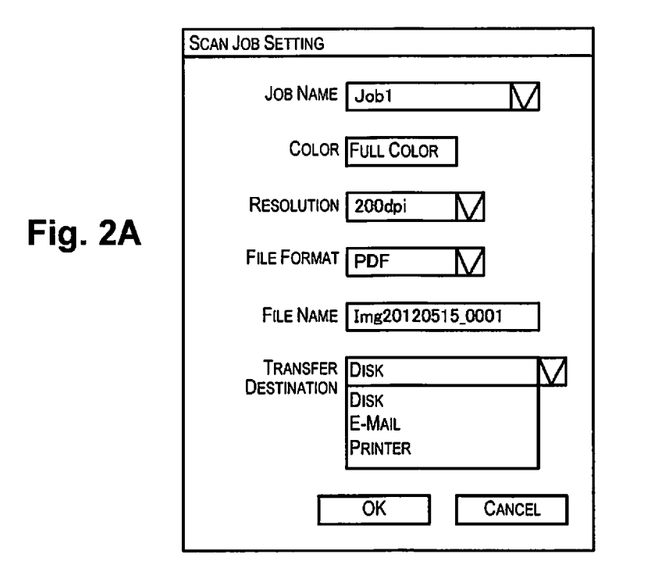
FIGS. 2A and 2B are screen configuration diagrams of an embodiment of the invention.

FIG. 2A shows an example of a GUI (Graphical User Interface) for setting the job in the PC 10. This kind of GUI is displayed on the screen of the display unit 13 by the processing unit 11 that executes the job management program functioning as the setting unit 11a. The job is set by various types of buttons or a drop down list box or text box being operated using the operating unit 14. A plurality of the jobs set in this way can be stored in each PC 10 for which the job management program is installed, and these are stored with a job name given to each respective item.

As described later, one of the jobs set in each PC 10 is selected with the scanner 20 and executed. However, if one attempts to display all the jobs set with each PC 10 as a list so as to be selectable with the scanner 20, the user ends up selecting the desired job from among a huge number of jobs, which is inconvenient.

Figure 2B:
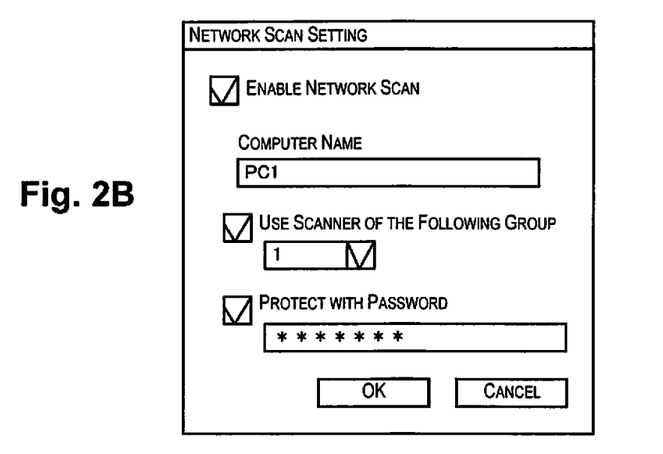

FIG. 2B shows an example of a GUI for giving a group ID to the job. This GUI is displayed on the screen of the display unit 13 of the PC 10 the processing unit 11 of the PC 10 that executes the job management program functioning as the setting unit 11a. Here, it is possible to set one group ID to each PC 10 for any job. In specific terms, when the OK button is selected in the state shown in FIG. 2B, the computer name "PC1" and the group name "1" are correlated and set. Specifically, the setting unit 11a of the PC 10 given the computer name "PC1" gives the group ID of group name "1" to all the set jobs, and stores them in the external storage 12 of the PC 10 that is itself given the computer name "PC1."

Figure 3:
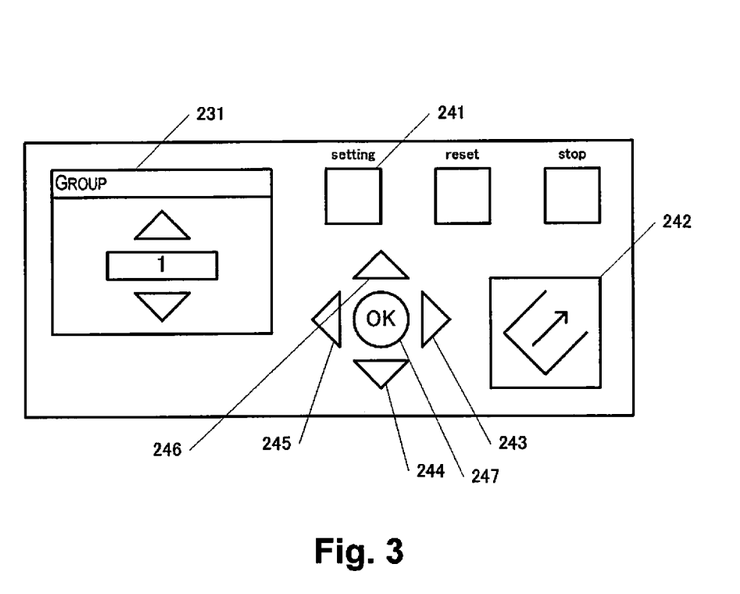
FIG. 3 is a plan view of an embodiment of the invention.

FIG. 3 shows an example of the GUI for giving the group ID to the scanner 20. This GUI is displayed on the screen 231 of the display unit 23 of the scanner 20 by the processing unit 21 of the scanner 20 that executes the firmware functioning as the display control unit 21b. Here, one group ID can be set for each scanner. In specific terms, when a setting button 241 is pressed, the GUI shown in FIG. 3 is displayed on the screen 231, and the group ID can be selected using direction keys 244 and 246. When OK button 247 is pressed in the state shown in FIG. 3, for example, that scanner 20 stores the group ID of "1" in its own external storage 25.

Figure 4:
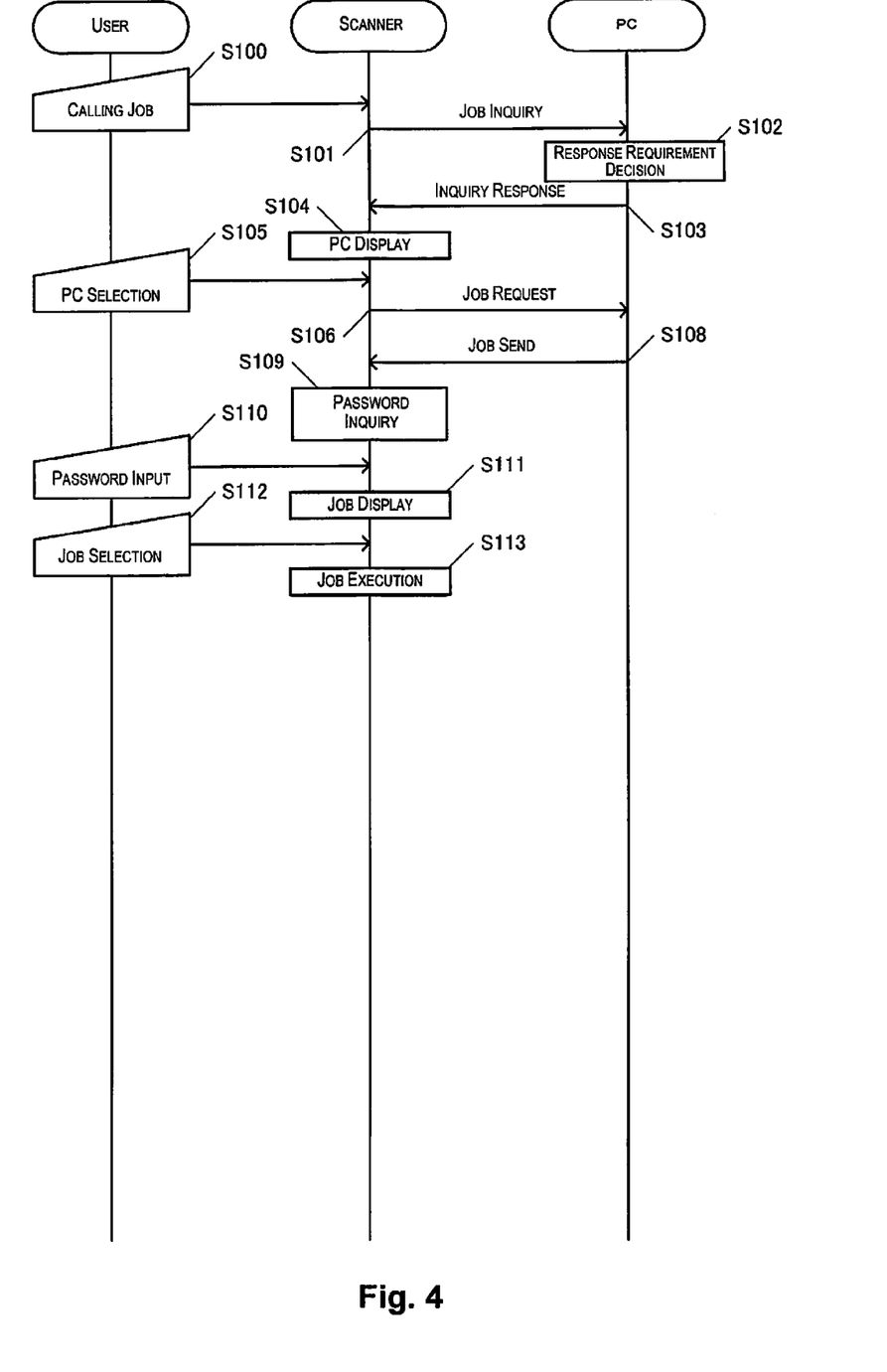
FIG. 4 is a sequence chart of an embodiment of the invention.

By using the group ID set in this way, it is possible to narrow down the jobs displayed so as to be selectable with the scanner 20. Following, we will give a detailed description while referring to the sequence chart shown in FIG. 4 and the screen transition diagram shown in FIGS. 5A-5D. The respective GUIs shown in FIGS. 5A-5D are displayed by the processing unit 21 functioning as the display control unit 21b. Also, instructions are input via the GUI by the processing unit 21 functioning as the operation receiving unit 21c, and processing is started according to the instructions.

The user performs with the scanner 20 the operation of calling the job for which the same group ID is set as the group ID set for his own PC 10 (S100). The screen 231 of each scanner 20 which is in the standby state or the state returned from the power saving mode is in the state shown in FIG. 5A. By pressing the OK button 247 in this state, the job is called and executed by doing as follows.

When the OK button 247 is pressed, the processing unit 21 sends job inquiries to all the PCs 20 on the same segment of the LAN 30 (S101). The job inquiry contains the group ID given to the scanner 20 sending it. The job inquiry sending and the job request described later are performed by the processing unit 21 functioning as the inquiry unit 21a.

Figure 6:
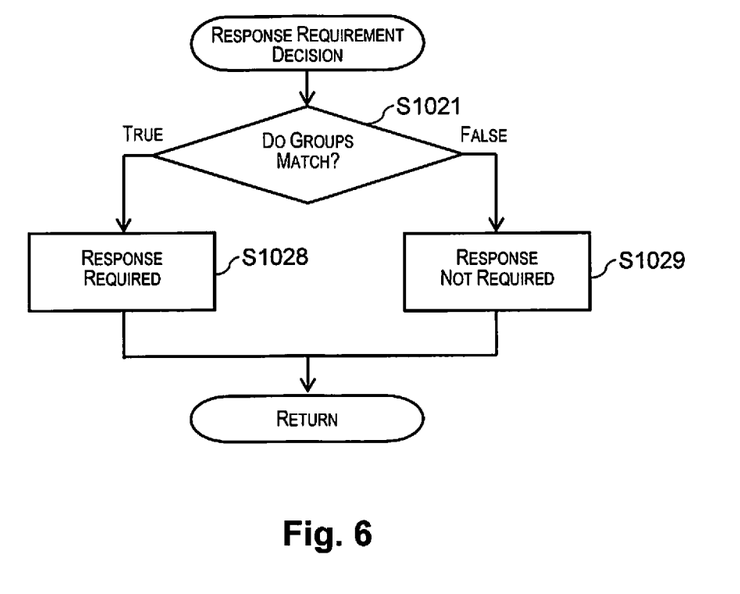
FIG. 6 is a flow chart of an embodiment of the invention.
Figure 7:
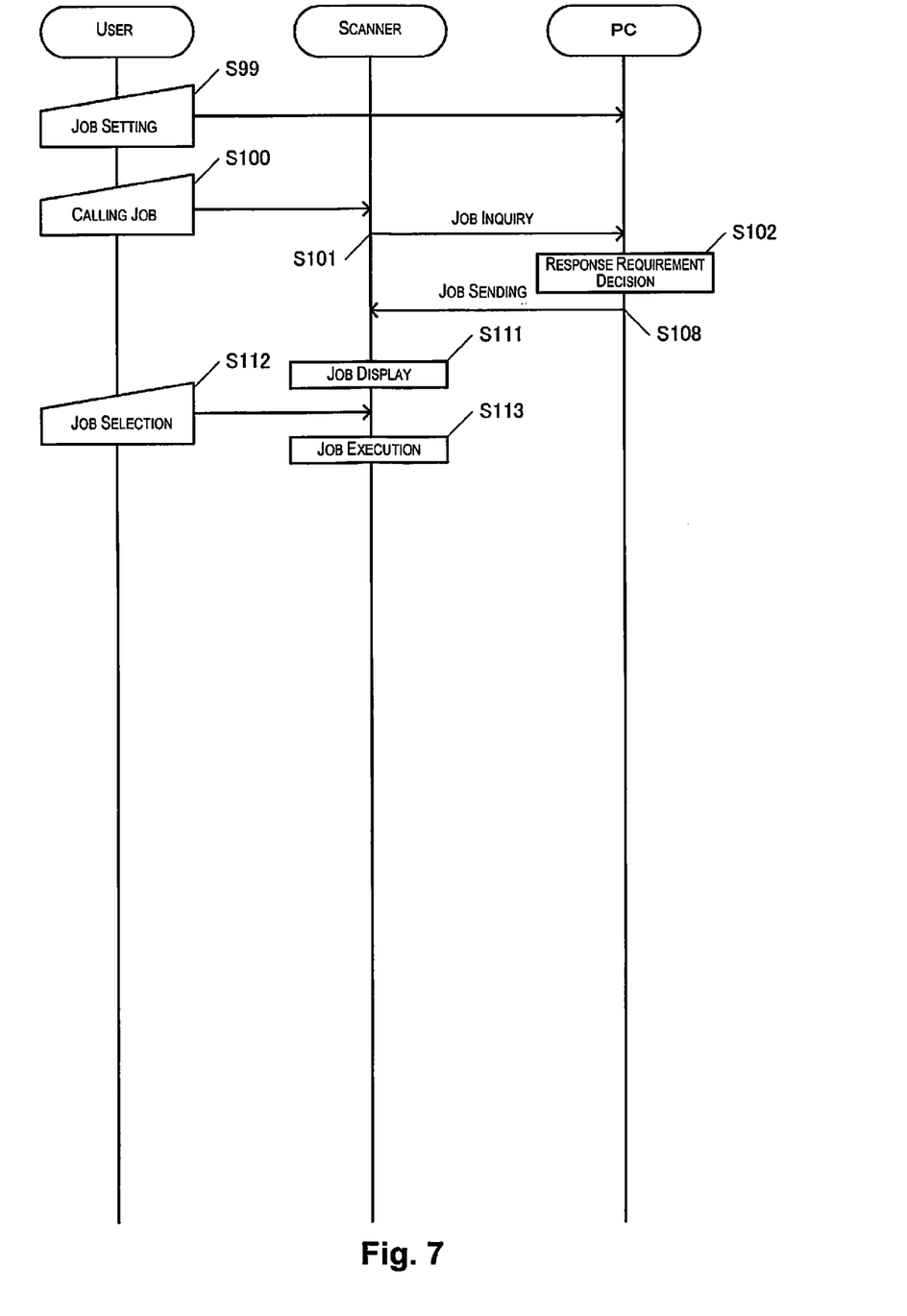
FIG. 7 is a sequence chart of an embodiment of the invention.

Each PC 10 that received the job inquiry decides whether or not to respond to that job inquiry (S102). This decision and the inquiry response and job sending described later are performed by the processing unit 11 functioning as the response unit 11b. FIG. 6 shows a flow chart of the process of deciding whether or not to respond to the job inquiry. With this process, a judgment is made of whether the group ID contained in the job inquiry matches the group ID given to the PC 10 that received this (S1021). Then, if they match, it is deemed that a response is required (S1028), and if they don't match, it is deemed that a response is not required (S1029). The PCs 10 for which it is determined that a response is not required do not respond to the job inquiry.

Next, the PC 10 for which it is judged that a response is required sends the inquiry response to the scanner 20 which is the sending source of the job inquiry (S103). The inquiry response contains the computer name given to the PC 10 sending the inquiry response. The inquiry response identifies and sends the sending source to the scanner 20 of the job inquiry sending source.

Figure 5A:
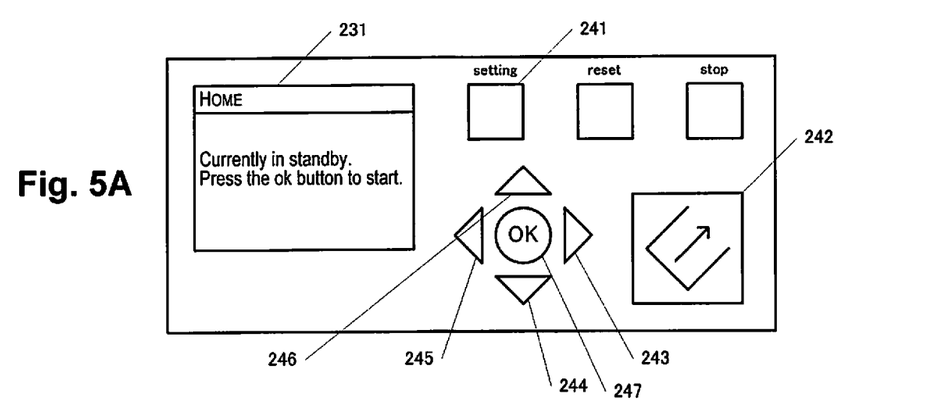
FIGS. 5A-5D are screen transition diagrams of an embodiment of the invention.
Figure 5B:
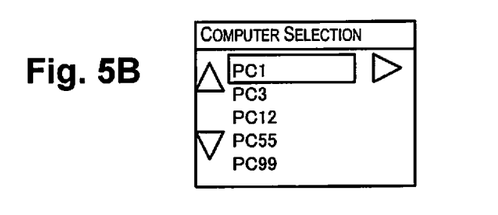

The scanner 20 that received the inquiry response to the job inquiry that it sent itself displays to be selectable as shown in FIG. 5B the computer name contained in the received inquiry response (S104). The number of computer names displayed on the screen 231 so as to be selectable using the direction keys 246 and 244 at this time can be made smaller than the number of PCs 10 on the same segment of the LAN 30 as that scanner 20. For example, even if an attempt is made to connect 100 PCs 10 on the same segment of the LAN 30 as the scanner 20 for which the group ID "1" is set, if there are five PCs 10 for which the group ID "1" is set, then there will be five computer names displayed on the scanner 20 for which the group ID "1" is set.

As shown in FIG. 5B, in a state with the computer names displayed so as to be selectable, when the direction key 243 is pressed by the user (S105), the processing unit 21 selects the PC 10 given the computer name selected at that time, and the job request is sent to the selected PC 10 (S106).

Figure 5C:
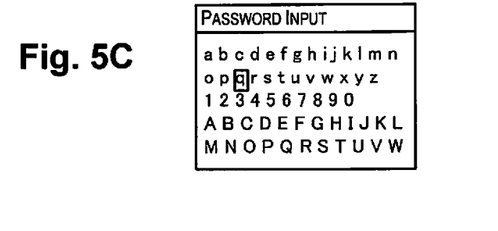

The PC 10 that received the job request sends the job to the scanner 20 that sent the job request (S108). Here, we will describe the password. When it is made possible for any user to select jobs set by respectively different users of a plurality of PCs 10 with the scanner 20, it is possible for a mistaken operation to occur of a job set by another person being selected and executed. In light of that, to prevent this kind of mistaken operation, it can also be made possible to set a password to make it impossible to select a job set by another person. With the GUI shown in FIG. 2B, it is possible to set a common password for jobs set with the same PC 10 that is unique to each PC 10. Of course, for example by providing a text box for inputting a password to the GUI shown in FIG. 2A, it is also possible to set a unique password for each job. Then, when this kind of password is set, the PC 10 can give the password and send the job to the scanner 20. Then, after the password is received, the scanner 20 can make a request to the user to input the password as shown in FIG. 5C before executing the job (S109).

The PC 10 can also give a password for the job inquiry response. When giving a password for the job inquiry response, in a state with computer names displayed so as to be selectable as shown in FIG. 5B, after the direction key 243 is pressed, before sending the job request, it is possible to request input of the password as shown in FIG. 5C.

Figure 5D:
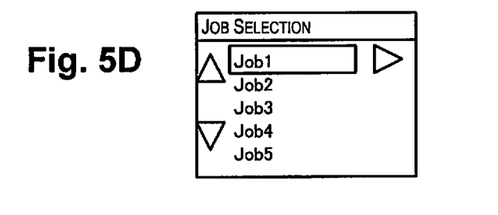

When the correct password is input by the user (S110), the scanner 20 displays job names so as for the job to be selectable as shown in FIG. 5D (S111).

In a state with job names displayed so as to be selectable as shown in FIG. 5D, tentative selection of a job is performed using direction keys 244 and 246. When the scan start key 242 is pressed by the user, the job selection is confirmed (S112). When the job selection is confirmed, the read processing unit 21 selects the job of the selected job name and executes it (S106). Specifically, the reading control unit 21d controls the reading unit 22 so as to read the image data from the original copy according to the reading method and resolution defined for the job, and outputs the read image data according to the output method defined for the job.

According to the first embodiment, it is possible to set the job with the PC 10 equipped with a keyboard, mouse, and wide screen and execute it with the scanner 20, so it is easy to set any job and have it executed by the scanner. Also, since it is possible to select a job after narrowing down the jobs displayed by selecting the PC 10, it is easy to select the desired job from a large number of jobs. Also, because the jobs displayed on the scanner 20 are extracted using the group ID, it is easy for the user to select the jobs set with his own PC 10. Also, because the PC 10 that responds to the job inquiry is limited, the burden is reduced for the process of narrowing down the jobs displayed so as to be selectable with the scanner 20.

2. Second Embodiment

With the first embodiment described above, it was possible to select all of the jobs stored in the external storage 12 of the PCs 10 belonging to a specified group with the scanner 20 belonging to the concerned specified group. Next, we will describe the second embodiment for extracting jobs with a high display priority level set for the PC 10 and displaying them so as to be selectable with the scanner 20 while referring to FIG. 7 through FIG. 11.

First, when the job is set by the user with the PC 10 (S99), the setting unit 11a receives the display priority level setting.

Figure 8:
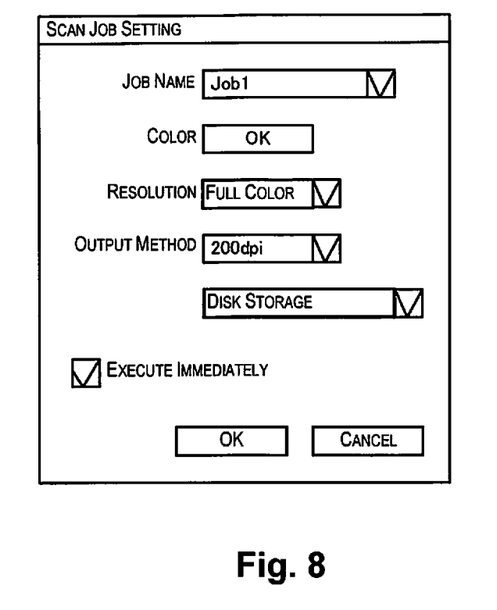
FIG. 8 is a screen configuration diagram of an embodiment of the invention.
Figure 9:
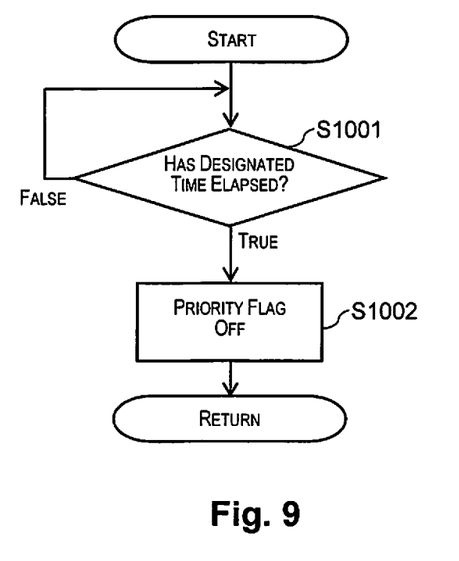
FIG. 9 is a flow chart of an embodiment of the invention.

For example with the GUI shown in FIG. 8, when the check box corresponding to "Execute immediately" is turned on, the display priority level is set high, and when it is off, the display priority level is set low. Specifically, with the GUI shown in FIG. 8, two stages of display priority level can be set using on or off of the flag as the display priority information. Then, when the display priority level is set high, by storing that setting time or setting a timer, the setting unit 11a returns the display priority level to a low level automatically after a designated time has elapsed. Specifically, as shown in FIG. 9, by referencing the setting time, current time, or a timer, the setting unit 11a judges whether the designated time has elapsed from when the priority flag went on (S1001), and when it has elapsed, it is possible to turn the priority flag off (S1002).

Figure 10:
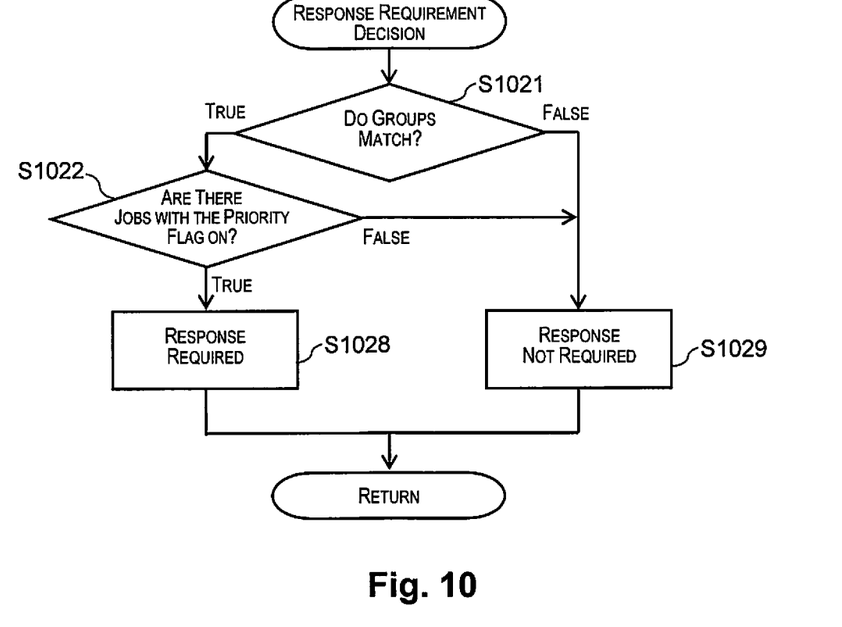
FIG. 10 is a flow chart of an embodiment of the invention.

With the decision of whether or not a response is required for the job inquiry, it is decided whether or not a response is required based on the group ID and the priority flag (S102). Specifically, as shown in FIG. 10, after judging whether or not the group ID matches at S1021, when the group ID does match, a judgment is made of whether or not there is a job for which the priority flag is on (S1022). If there is a job for which the priority flag is on, a response is determined to be required (S1028), and if not, a response is determined not to be necessary (S1029).

Next, jobs are sent to the scanner 20 only from PCs 10 for which the scanner 20 and the group ID match, and for which jobs are set with the priority flag on (S108).

Figure 11:
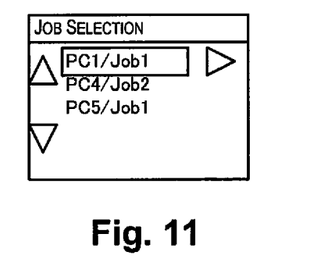
FIG. 11 is a screen configuration diagram of an embodiment of the invention.

FIG. 11 shows an example of a GUI for displaying on the scanner 20 jobs so as to be selectable at step S111. As shown in FIG. 11, by noting together the job name and the computer name, it is easier for the user to select the desired job. Also, when the display sequence is changed for the computer name or the job name, it is preferable to display these.

In this way, with the second embodiment, since the job displayed on the scanner 20 is extracted using the priority flag, it is even easier for the user to select jobs set with his own PC 10. With this embodiment, the required operations for the user to select the desired job has been reduced by not performing the series of processes (S103 to S106) for requesting a job after selecting any of the PCs 10 with the scanner 20, but it is also acceptable to perform them. Also, for password verification as well, with this embodiment it is not performed, but it is also acceptable to perform it.

3. Third Embodiment

With the second embodiment, we described an example for which it was possible to set two stages of display priority level using on and off of the priority flag, but with this embodiment, we will describe an example of making it possible to set three or more stages of display priority level.

Figure 12:
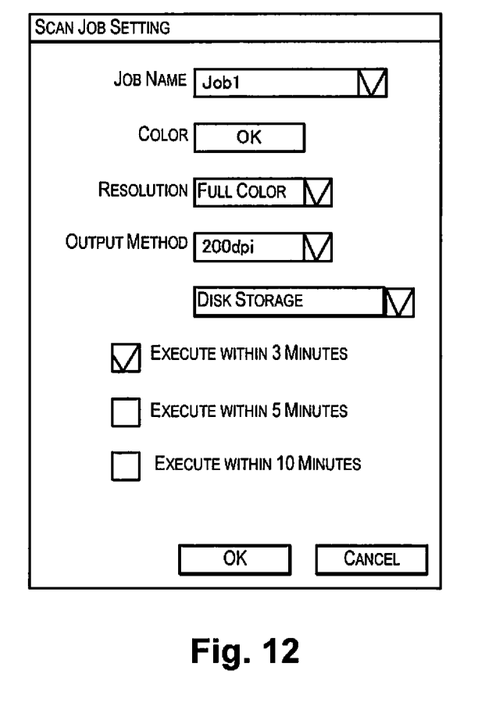
FIG. 12 is a screen configuration diagram of an embodiment of the invention.

FIG. 12 shows an example of a GUI for setting three or more stages of display priority level for each job with the respective PCs 10. With this embodiment, with the estimated period from setting the job until read execution as the display priority information, the shorter the estimated period, the higher the display priority level. Specifically, it is possible to alternatively select three choices of "execute within 3 minutes," "execute within 5 minutes," and "execute within 10 minutes." Then, the shorter the estimated period of the job with the scanner 20, the higher position it is displayed at. However, in such a case, so that the job one set oneself is always displayed at the higher position, there is the risk that the shortest estimated period will always be set regardless of the actual estimated time. Therefore, jobs for which the estimated period has elapsed are preferably made not to be displayed on the scanner 20.

Figure 13:
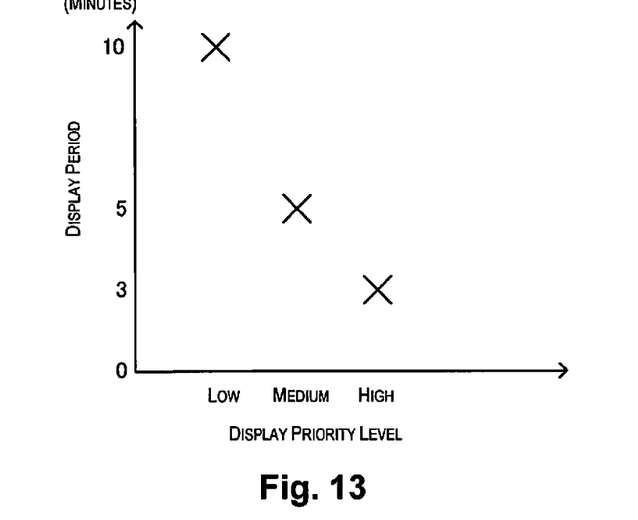
FIG. 13 is a graph of an embodiment of the invention.

FIG. 13 is a graph showing the relationship between the period for which the job is displayed and the display priority level with the scanner 20. As shown in FIG. 13, the lower the display priority level, specifically, the longer the estimated period from setting of the job until read execution, the longer the display period from when the job is set until that job is no longer displayed on the scanner 20 Also, conversely, the higher the display priority level, specifically, the shorter the estimated period from setting of the job until read execution, the shorter the display period from when the job is set until that job is no longer displayed on the scanner 20.

To display the job on the scanner 20 according to the display priority level and the display period in this way, at step S1001 shown in FIG. 9, a determination is made of whether or not the estimated period has elapsed after the job is set, and when the estimated period has elapsed, the priority flag is turned off. Then at step S108 shown in FIG. 7, the estimated period (display priority level) is attached to the job and it is sent.

Here, we will assume that the jobs shown below are set respectively for a plurality of PCs 10 at a certain time $t_0$.

TABLE 1

| PC Name | Job Name | Estimated Period (Minutes) |
|---------|----------|---------------------------|
| PC 65   | Job 1    | 3                         |
| PC 4    | Job 2    | 5                         |
| PC 5    | Job 1    | 5                         |
| PC 10   | Job 1    | 5                         |
| PC 7    | Job 3    | 10                        |

Figure 14A:
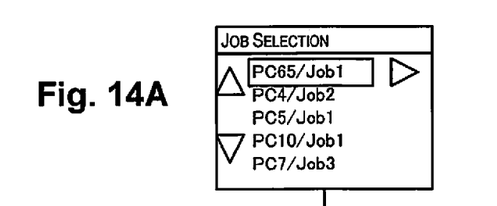
FIGS. 14A-14C are screen transition diagrams of an embodiment of the invention.
Figure 14B:
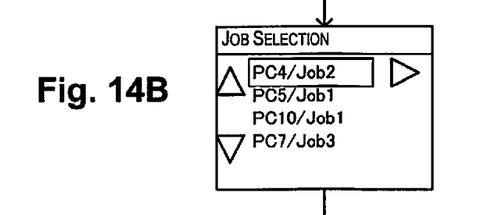
Figure 14C:
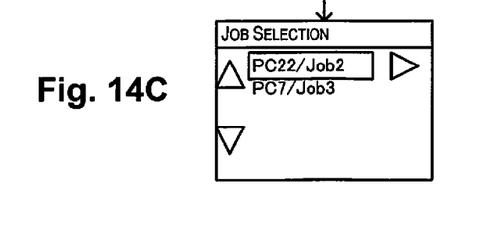

When the job is displayed on the scanner 20 within 3 minutes from time $t_0$, as shown in FIG. 14A, the "Job 1" set with the "PC 65" is displayed at the topmost position, and the "Job 3" set with the "PC 7" is displayed at the bottommost position. Then, when 3 minutes elapses from time $t_0$, as shown in FIG. 14B, the "Job 1" set with the "PC 65" is no longer displayed, and instead, the "Job 2" set with the "PC 4" is displayed at the topmost position. Furthermore, when the estimated period of the "Job 2" is changed to "3" with the PC 10 with the computer name "PC 22" during from 5 minutes or more to less than 10 minutes elapsing from time $t_0$, the display on the scanner 20 after the change is as shown in FIG. 14C with the "Job 2" set with the "PC 22" displayed at the topmost position, and the "Job 2" set with the "PC 4," the "Job 1" set with the "PC 5," and the "Job 1" set with the PC 10" no longer displayed, and at time $t_0$, the "Job 3" for which the display priority level was set to "10" with the "PC 7" displayed at the bottommost position.

In this way, with the third embodiment, it is possible to set the display priority level according to the degree of urgency of the user trying to use the scanner 20, and the higher the set degree of urgency, the easier it is to select the job set by oneself, and to display it on the scanner 20. With this embodiment, we described an example when by turning the priority flag off when the estimated period has elapsed, the display priority level is lowered to the bottommost position, but it is also possible to raise the display priority level according to the remaining time of the estimated period and to lower the display priority level to the bottommost position when the estimated time has elapsed.

4. Other Embodiments

The technical scope of the invention is not limited to the embodiments described above, and of course it is possible to add various modifications within a scope that does not stray from the gist of the invention. For example, with this embodiment, jobs for which the priority flag was off, specifically, jobs with the lower display priority level, are not displayed on the scanner 20, but it is also possible to make it possible to select all the jobs with the scanner regardless of the display priority level, and to raise and lower the job display rank according to the display priority level. Also, for example, with the embodiment noted above, the higher the display priority rank the higher the job is displayed in the display position on the list, but it is also possible to display the job on the GUI of the highest position layer the higher the display priority rank is. Specifically, for example, it is possible to introduce a hierarchy to the GUI for selecting the jobs, and to display the jobs for which the priority flag is on on the uppermost hierarchy list, and to display the jobs for which the priority flag is off on the bottommost hierarchy list.

Also for example, by containing the time at which the job was finally set in the job as the display priority information, it is possible to set the display rank of the job based on that setting time. Specifically, it is assumed the job will be set when the user has the intention to execute the job within a fixed period, so the closer the set time is to the current time, by making the display rank higher, it is possible to display the job at the higher position the higher the degree of urgency or the higher the use frequency.

What is claimed is:

1. An image reading system comprising:
   an image reading device configured to scan image; and
   a plurality of information terminals connected to the image reading device by a communication network,
   each of the plurality of information terminals including
      a first storage unit,
      a setting unit configured to set a job to be executed by the image reading device, the setting unit being further configured to correlate the job to a group ID and store them in the first storage unit, and
      a response unit configured to respond to a job inquiry and send the job to the image reading device, and
   the image reading device including
      a second storage unit configured to store a group ID of the image reading device,
      an inquiry unit configured to send the job inquiry with the group ID of the image reading device that is stored in the second storage unit to the plurality of information terminals, respectively,
      a display unit configured to display the jobs that have been received from the plurality of information terminals so as to be selectable in response to the job inquiry to the plurality of information terminals, respectively, the display unit being further configured to display the jobs when the group ID that is stored in the first storage unit and is correlated to the jobs matches with the group ID of the image reading device that is stored in the second storage unit and is contained in the job inquiry,
      a selection unit configured to select one of the jobs that have been displayed, and
      an execution unit configured to scan image based on the selected one of the jobs.

2. The image reading system according to claim 1, wherein the display unit receives any group ID selection, and displays the job correlated to the selected group ID so as to be selectable.

3. The image reading system according to claim 1, wherein the setting unit attaches display priority information and sets the job, and
   the display unit displays the job extracted based on the display priority information so as to be selectable.

4. The image reading system according to claim 3, wherein the setting unit receives the setting of two stages or more of display priority levels, attaches the display priority information indicating the set display priority level, and sets the job, and
   the display unit displays the jobs with the relatively high display priority level at a relatively high position.

5. The image reading system according to claim 4, wherein the setting unit lowers the display priority level after a designated time has elapsed after the display priority level has been raised.

6. The image reading system according to claim 5, wherein the setting unit lowers the display priority level after a period of time has elapsed according to the display priority level after the display priority level has been raised, and
   the period according to the display priority level is shorter the higher the display priority level is, and is longer the lower the display priority level is.

7. An image reading device configured to be connected by a communication network to a plurality of information terminals that includes a first storage unit, a setting unit for setting a job, correlating the job to a group ID and storing them in the first storage unit, and a response unit for responding to a job inquiry and sending the job, the image reading device comprising:
   a second storage unit configured to store a group ID of the image reading device;
   an inquiry unit configured to send the job inquiry with the group ID of the image reading device that is stored in the second storage unit to the plurality of information terminals, respectively;
   a display unit configured to display the jobs received from the plurality of information terminals so as to be selectable in response to the job inquiry to the plurality of information terminals, respectively, the display unit being further configured to display the jobs when the group ID that is stored in the first storage unit and is correlated to the jobs matches with the group ID of the image reading device that is stored in the second storage unit and is contained in the job inquiry;
   a selection unit configured to select one of the jobs that has been displayed; and
   an execution unit configured to scan image based on the selected one of the jobs.

8. A non-transitory computer-readable medium that stores a job management program for causing a computer that is connected by a communication network to an image reading device including a second storage unit for storing a group ID of the image reading device, an inquiry unit for sending a job inquiry with the group ID of the image reading device that is stored in the second storage unit to a plurality of information terminals, a display unit for displaying jobs that have been received so as to be selectable in response to the job inquiry, a selection unit for selecting one of the jobs that have been displayed, and an execution unit for scanning image based on the selected one of the jobs, to execute:
   setting the job to be executed on the image reading device;
   correlating the job to a group ID and storing them; and
   responding to the job inquiry and sending the job to the image reading device to display the job with the display unit of the image reading device when the group ID stored and correlated to the job matches the group ID of the image reading device that is stored in the second storage unit and is contained in the job inquiry.

* * * * *